UNITED STATES PATENT OFFICE.

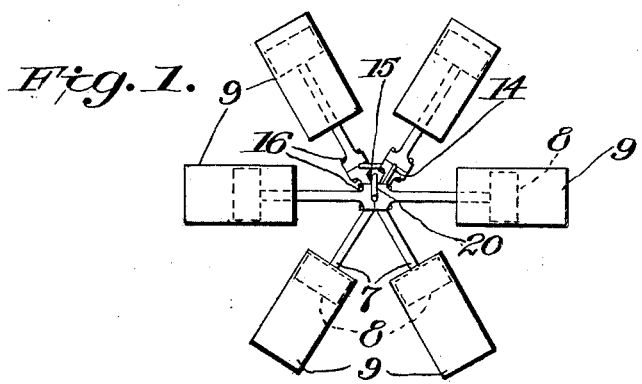
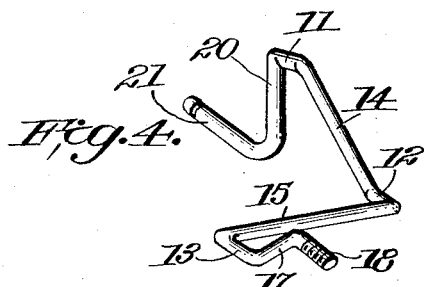
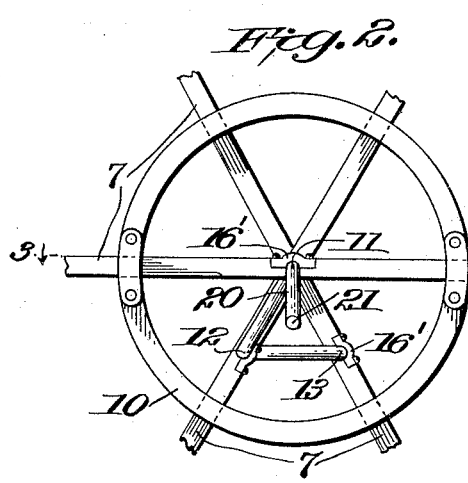
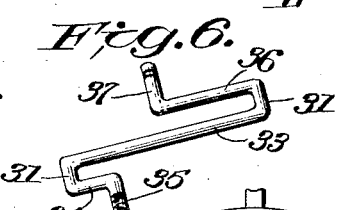
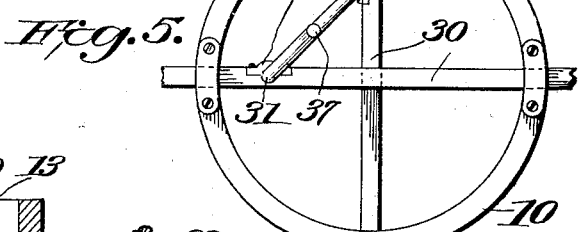
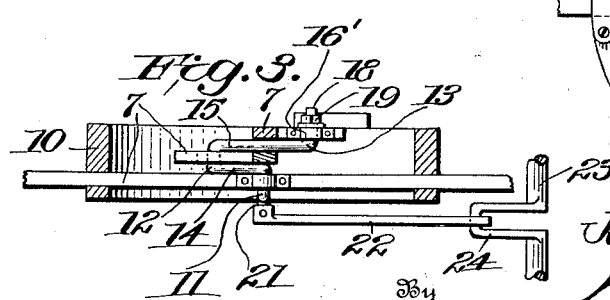

JOSEPH J. LOEPER, OF CAMP MEADE, MARYLAND.

MECHANICAL MOVEMENT.

1,329,783.  Specification of Letters Patent.  Patented Feb. 3, 1920.

Application filed June 28, 1918. Serial No. 242,431.

*To all whom it may concern:*

Be it known that I, JOSEPH J. LOEPER, a citizen of the United States, residing at Camp Meade, in the county of Anne Arundel and State of Maryland, have invented certain new and useful Improvements in Mechanical Movements, of which the following is a specification.

My invention relates to a mechanical movement and its aim is to provide a novel, useful, simple and effective construction.

One main object is to produce such a device as may connect a plurality of crossed radial members for successive reciprocations and be journaled to each member midway of its ends.

Additional objects and advantages will become apparent as the invention is described and claimed hereinafter with relation to accompanying drawings illustrating one embodiment and wherein:—

Figure 1 is a diagrammatic view of an engine utilizing my improvement;

Fig. 2 is an enlarged fragmentary view showing my improvement in connection with piston rods and a bearing therefor;

Fig. 3 is a cross sectional view on the line 3—3 of Fig. 2;

Fig. 4 is a detailed perspective view of the crank member essentially comprising my invention;

Fig. 5 is a view similar to Fig. 2 but showing the use of a modified form, and

Fig. 6 is a detailed perspective view of the modified form of crank used in Fig. 5.

My improvements are capable of use in connection with crossed radial reciprocatory rods or members 7. As one example, these rods may constitute the piston rods used in an engine of the rotary type or one having radial cylinders, as suggested in Fig. 1. The improvements enables such an engine to be built compactly and with relatively short pistons. In this figure, the pistons are designated 8 and the cylinders are designated 9. The rods 7 reciprocate or slide through a frame or bearing 10 which may be employed, in some instances. As shown in Fig. 1, however, the bearing 10 may be dispensed with.

The connecting crank device essentially comprising my improvement, is shown in Fig. 4, as having three cranks, horizontally disposed, at 11, 12 and 13. These cranks are connected by diagonally disposed arms 14 and 15 and are disposed at the three corners of an equilateral triangle. The said cranks 11, 12 and 13, are respectively journaled in the rods 7 midway of their ends and are held in place by any suitable means. In Fig. 1 the rods 7 are made in two sections fastened together around the cranks as by bolts 16 while in Figs. 2 and 3 they are fastened by means of removable bearing 16'. When in place, arms 14 and 15 are disposed for movement in the spaces intermediate the rods 7. From crank 13, an arm 17 extends outwardly, preferably at an angle to the arm 15, and terminates in a screw threaded shank 18 which may receive a fastening device like a nut 19. From crank 11, an arm 20 extends inwardly and then outwardly into an arm 21.

In instances where rods 7 merely reciprocate without revolving, power may be derived from the crank device or be imparted thereto by means of a pitman 22 suitably journaled on the arm 21 and connecting to a power or driven shaft 23 at a crank 24 thereof, as shown in Fig. 3. It will be realized, that as the rods 7 reciprocate, the positions of the cranks 11, 12 and 13, are varied, according to the movements of the rods, or the positions of the rods are varied according to the movement imparted to the cranks.

Each crank 11, 12 and 13, during turning of the arm 21, moves to one extremity of the throw of the respective rods and then to the other extremity, accordingly reciprocating the rods. Due to the equi-distant positioning of the cranks, the rods will reciprocate and move in proper sequence.

My improvements are capable of use with rods or members of any even number. In Figs. 5 and 6, for instance, I have shown a modified form in which but two reciprocating rods are used and accordingly two cranks are used. In these figures, frame 10 supports two reciprocating rods 30, crossing at right angles to each other, and having cranks 31 journaled at their centers and preferably held in place by removable bearings 32. An arm 33 connects the cranks 31 and an arm 34 leads from cranks 31 and terminates in a screw threaded shank 35 which may receive a fastening nut beyond its associated rod, like the nut 19. From the other arm 21, an arm 36 extends, terminating in an outwardly projecting arm 37, equivalent to arm 21, inasmuch as it directly receives or transmits power to a pitman or other means.

Since my invention is capable of use as a mechanical movement, I do not desire to be limited to its use in connection with engines, pumps or the like. Also, since merely a preferred embodiment has been illustrated and described, it is to be understood that changes in the details of construction thereof may be resorted to within the spirit and scope of my invention.

I claim:—

1. A mechanical movement including reciprocating members, a frame through which said members are movably mounted, transmission means within the frame, said means having cranks journaled to the reciprocatory members midway of their ends, diagonally disposed arms connecting the cranks, and retainer arms disposed at an angle to the said cranks and said arms.

2. A mechanical movement including reciprocating members, a circular frame through which said members slide, transmission means within the frame, said means having cranks journaled to the reciprocatory members midway of their ends, said cranks being disposed at the three corners of an equilateral triangle, and diagonally disposed arms connecting the cranks.

3. A mechanical movement including reciprocating members, a circular frame through which said members are movably mounted, transmission means within the frame, said means having cranks disposed at the three corners of an equilateral triangle and journaled to the reciprocatory members, diagonally disposed arms connecting the cranks, retainer arms disposed at an angle to the cranks and to said arms and overlapping the adjacent reciprocatory member, an arm extending from one of said retainer arms and provided with screw threads, a nut mounted on said screw threads, a power arm extending at an angle from the other retainer arm, and a power means connected with the power arm.

In testimony whereof, I have affixed my signature in the presence of two witnesses.

JOSEPH J. LOEPER.

Witnesses:
WM. PAUL LANGREICH,
ANGELA MYERS.